(12) United States Patent
Pocklington et al.

(10) Patent No.: US 8,677,168 B2
(45) Date of Patent: Mar. 18, 2014

(54) ALLOCATING POWER IN DEVICES BY RESERVING A STATIC POWER ALLOCATION TO BE USED BY ONE OR MORE PREDETERMINED SUBSYSTEMS AND RESERVING A DYNAMIC POWER ALLOCATION TO BE USED WHEN THE STATIC POWER ALLOCATION IS INSUFFICIENT

(75) Inventors: Richard Pocklington, Burlington (CA); Anthony Russello, Hamilton (CA)

(73) Assignee: Z124, George Town (KY)

( * ) Notice: Subject to any disclaimer, the term of this patent is extended or adjusted under 35 U.S.C. 154(b) by 84 days.

(21) Appl. No.: 13/036,659

(22) Filed: Feb. 28, 2011

(65) Prior Publication Data

US 2012/0221878 A1 Aug. 30, 2012

(51) Int. Cl.
*G06F 1/30* (2006.01)
*G06F 1/26* (2006.01)

(52) U.S. Cl.
USPC .......................................... 713/340; 713/300

(58) Field of Classification Search
None
See application file for complete search history.

(56) References Cited

U.S. PATENT DOCUMENTS

| | | | |
|---|---|---|---|
| 7,057,372 | B2 | 6/2006 | Chen et al. |
| 7,627,343 | B2 | 12/2009 | Fadell et al. |
| 7,719,830 | B2 | 5/2010 | Howarth et al. |
| 7,873,852 | B2 | 1/2011 | Bell |
| 7,876,852 | B2 | 1/2011 | Schimpe |
| 2008/0307243 | A1* | 12/2008 | Lee ............................... 713/320 |
| 2009/0013204 | A1* | 1/2009 | Kobayashi et al. ........... 713/340 |
| 2012/0047379 | A1* | 2/2012 | Chen et al. .................... 713/320 |
| 2012/0081267 | A1 | 4/2012 | Sirpal et al. |
| 2012/0081268 | A1 | 4/2012 | Sirpal et al. |
| 2012/0081269 | A1 | 4/2012 | de Paz |
| 2012/0081270 | A1 | 4/2012 | Gimpl et al. |
| 2012/0081271 | A1 | 4/2012 | Gimpl et al. |
| 2012/0081280 | A1 | 4/2012 | Schrock et al. |
| 2012/0081289 | A1 | 4/2012 | Sirpal et al. |
| 2012/0081292 | A1 | 4/2012 | Sirpal et al. |
| 2012/0081293 | A1 | 4/2012 | Sirpal et al. |
| 2012/0081302 | A1 | 4/2012 | Gimpl et al. |
| 2012/0081303 | A1 | 4/2012 | Cassar et al. |
| 2012/0081304 | A1 | 4/2012 | Sirpal et al. |
| 2012/0081305 | A1 | 4/2012 | Schrock |
| 2012/0081306 | A1 | 4/2012 | Sirpal et al. |

(Continued)

OTHER PUBLICATIONS http://en.wikipedia.org/wiki/Malloc, pp. 1-13, Apr. 8, 2011.

(Continued)

*Primary Examiner* — Thomas Lee
*Assistant Examiner* — Robert Cassity
(74) *Attorney, Agent, or Firm* — Sheridan Ross P.C.

(57) ABSTRACT

Management of power resources of an electronic device are disclosed. The electronic device has multiple subsystems in communication with a power supply, and an interface in communication with the subsystems. A directive is received with the interface to perform a function with the electronic device. A subset of the subsystems needed to perform the function are identified. For each identified subsystem and in response to receipt of the directive, a predicted power-resource quantity needed to perform the function is determined. A determination is made whether sufficient unallocated resources of the power supply are available to accommodate the predicted power-resource quantity for each identified subsystem. Respective portions of the available and unallocated resources of the power supply are accordingly allocated for use by respective identified subsystems in accordance with the determined power-resource quantities, with such allocation rendering the respective portions unavailable for use other than by the respective subsystems.

28 Claims, 9 Drawing Sheets

(56) References Cited

U.S. PATENT DOCUMENTS

| | | |
|---|---|---|
| 2012/0081307 A1 | 4/2012 | Sirpal et al. |
| 2012/0081308 A1 | 4/2012 | Sirpal |
| 2012/0081309 A1 | 4/2012 | Sirpal et al. |
| 2012/0081310 A1 | 4/2012 | Schrock |
| 2012/0081311 A1 | 4/2012 | Sirpal et al. |
| 2012/0081312 A1 | 4/2012 | Sirpal et al. |
| 2012/0081313 A1 | 4/2012 | Sirpal et al. |
| 2012/0081314 A1 | 4/2012 | Sirpal et al. |
| 2012/0081315 A1 | 4/2012 | Sirpal |
| 2012/0081316 A1 | 4/2012 | Sirpal et al. |
| 2012/0081317 A1 | 4/2012 | Sirpal et al. |
| 2012/0081318 A1 | 4/2012 | Sirpal et al. |
| 2012/0081319 A1 | 4/2012 | Gimpl et al. |
| 2012/0081322 A1 | 4/2012 | Sirpal et al. |
| 2012/0081323 A1 | 4/2012 | Sirpal et al. |
| 2012/0081397 A1 | 4/2012 | de Paz |
| 2012/0081398 A1 | 4/2012 | Sirpal et al. |
| 2012/0081399 A1 | 4/2012 | Sirpal et al. |
| 2012/0081400 A1 | 4/2012 | Schrock et al. |
| 2012/0081401 A1 | 4/2012 | Sirpal et al. |
| 2012/0081403 A1 | 4/2012 | Sirpal et al. |
| 2012/0081854 A1 | 4/2012 | Sirpal et al. |
| 2012/0083319 A1 | 4/2012 | Sirpal et al. |
| 2012/0084673 A1 | 4/2012 | Sirpal et al. |
| 2012/0084674 A1 | 4/2012 | Visosky |
| 2012/0084675 A1 | 4/2012 | Sirpal et al. |
| 2012/0084676 A1 | 4/2012 | de Paz |
| 2012/0084677 A1 | 4/2012 | Sirpal et al. |
| 2012/0084678 A1 | 4/2012 | Sirpal et al. |
| 2012/0084679 A1 | 4/2012 | Sirpal et al. |
| 2012/0084680 A1 | 4/2012 | Gimpl et al. |
| 2012/0084681 A1 | 4/2012 | Cassar |
| 2012/0084682 A1 | 4/2012 | Sirpal et al. |
| 2012/0084686 A1 | 4/2012 | Sirpal et al. |
| 2012/0084687 A1 | 4/2012 | Sirpal et al. |
| 2012/0084693 A1 | 4/2012 | Sirpal et al. |
| 2012/0084694 A1 | 4/2012 | Sirpal et al. |
| 2012/0084698 A1 | 4/2012 | Sirpal et al. |
| 2012/0084699 A1 | 4/2012 | Sirpal et al. |
| 2012/0084700 A1 | 4/2012 | Sirpal et al. |
| 2012/0084701 A1 | 4/2012 | Sirpal et al. |
| 2012/0084706 A1 | 4/2012 | Sirpal et al. |
| 2012/0084709 A1 | 4/2012 | Sirpal |
| 2012/0084710 A1 | 4/2012 | Sirpal et al. |
| 2012/0084712 A1 | 4/2012 | Gimpl et al. |
| 2012/0084714 A1 | 4/2012 | Sirpal et al. |
| 2012/0084715 A1 | 4/2012 | Sirpal et al. |
| 2012/0084716 A1 | 4/2012 | Sirpal et al. |
| 2012/0084718 A1 | 4/2012 | Gimpl et al. |
| 2012/0084719 A1 | 4/2012 | Sirpal et al. |
| 2012/0084720 A1 | 4/2012 | Sirpal et al. |
| 2012/0084721 A1 | 4/2012 | Gimpl et al. |
| 2012/0084722 A1 | 4/2012 | Cassar et al. |
| 2012/0084723 A1 | 4/2012 | Reeves et al. |
| 2012/0084724 A1 | 4/2012 | Sirpal et al. |
| 2012/0084725 A1 | 4/2012 | Sirpal et al. |
| 2012/0084726 A1 | 4/2012 | Sirpal et al. |
| 2012/0084727 A1 | 4/2012 | Sirpal et al. |
| 2012/0084739 A1 | 4/2012 | Sirpal et al. |
| 2012/0105363 A1 | 5/2012 | Sirpal et al. |
| 2012/0110486 A1 | 5/2012 | Sirpal et al. |
| 2012/0110497 A1 | 5/2012 | Gimpl et al. |
| 2012/0117495 A1 | 5/2012 | Sirpal et al. |
| 2012/0124490 A1 | 5/2012 | Sirpal et al. |
| 2012/0144323 A1 | 6/2012 | Sirpal et al. |
| 2012/0174028 A1 | 7/2012 | Sirpal et al. |
| 2012/0210150 A1* | 8/2012 | de Lind Van Wijngaarden et al. .............................. 713/320 |
| 2012/0221868 A1 | 8/2012 | Pocklington et al. |
| 2013/0078994 A1 | 3/2013 | Jouin |
| 2013/0078995 A1 | 3/2013 | Jouin |
| 2013/0079054 A1 | 3/2013 | Jouin |
| 2013/0086293 A1 | 4/2013 | Bosse et al. |

OTHER PUBLICATIONS

Google Image Result Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

"Malloc-a memory allocator," The Open Group Base Specifications, 2008, Issue 7, 2 pages, retrieved from www.opengroup.org/onlinepubs/9699919799/functions/malloc.html.

Website entitled "Lapdock™ for Motorola ATRIX," Motorola Mobility, Inc, 2011, [retrieved on Apr. 18, 2011], 1 page. Retrieved from: www.motorola.com/Consumers/US-EN/Consumer-Product-and-Services/Mobile+Ph . . . .

Website entitled, "Juice pack air™ for iPhone 4," Mophie, 2010, [retrieved on Mar. 1, 2013], 3 pages. Retrieved from: www.web.archive.org/web/20101011165412/http://www.mophie.com/mophie-juice-pack-air-Phone-4-battery-case-p/1145_jpaxp4.html.

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Wikipedia, "C dynamic memory allocation," Nov. 7, 2009, [retrieved on Mar. 4, 2013], 6 pages, retrieved from: www.en.wikipedia.org/w/index.php?title=Windows_Task_Manager&oldid=324387462.

Wikipedia, "Windows Task Manager," May 8, 2009, [retrieved on Mar. 4, 2013], 9 pages, retrieved from: www.en.wikipedia.org/w/index.php?title=C_dynamic_memory_allocation&oldid=288701334.

Burns, "Motorola ATRIX 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: vvww.unp.me/f106/kyocera-echo-dual-screen-android-phone-143800/.

Stein, "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1.html.

U.S. Appl. No. 13/843,195, filed Mar. 15, 2013, Flynn.

* cited by examiner

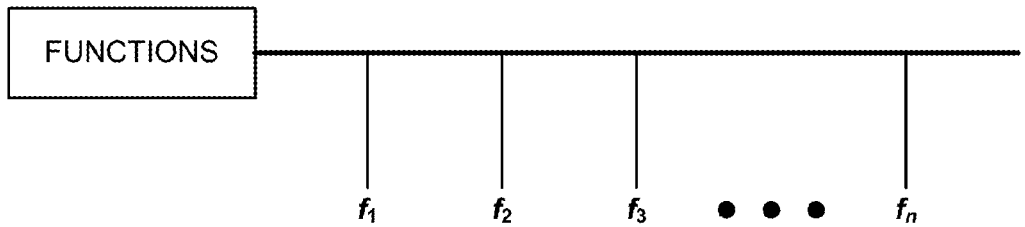
Fig. 2A
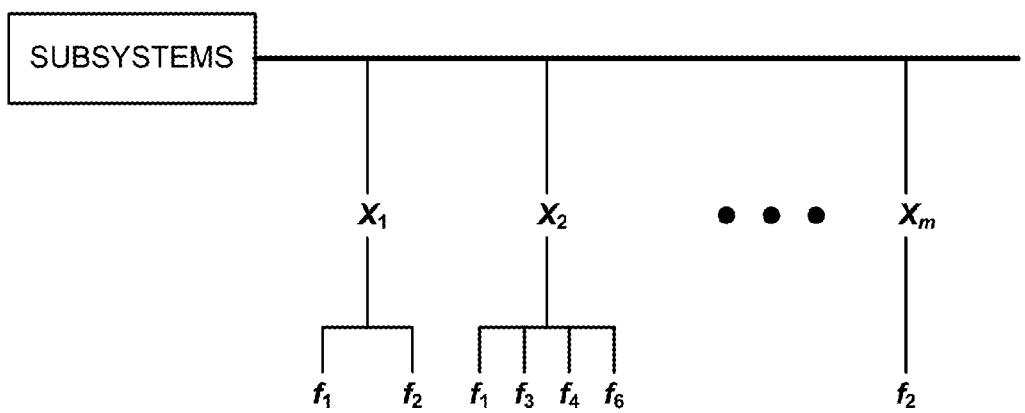
Fig. 2B
Fig. 3

ALLOCATING POWER IN DEVICES BY RESERVING A STATIC POWER ALLOCATION TO BE USED BY ONE OR MORE PREDETERMINED SUBSYSTEMS AND RESERVING A DYNAMIC POWER ALLOCATION TO BE USED WHEN THE STATIC POWER ALLOCATION IS INSUFFICIENT

CROSS REFERENCE TO RELATED APPLICATION

This application is being filed concurrently with commonly assigned U.S. Pat. Appl. Ser. No. 13/036,838, entitled "POWER-ALLOCATION INTERFACE", the entire disclosure of which is incorporated herein by reference for all purposes.

BACKGROUND OF THE INVENTION

This application relates generally to power systems. More specifically, this application relates to power allocation in devices, such as electronic communication devices.

There are increasingly many types of mobile communications devices available to consumers, including mobile telephones, smart phones, pagers, wireless Internet appliances, and others. While power supply is a concern with almost all electronic devices, it is of particular relevance to mobile communications devices that necessarily include a power supply within a relatively small housing. Such power supplies currently take the form of a rechargeable battery, which is drawn on by any number of subsystems within the device depending on how the device is used. For instance, a typical mobile communications device may include input/output circuits, wireless communication circuits, camera circuits, global-positioning-system circuits, accelerometer circuits, among others, as well as a variety of processing circuits to support voice-communication, data-transfer, and other functionality. The various subsystems of the device may support a number of different functions, with the power requirements of the specific subsystems involved with each function perhaps varying according to the particular requirements of the functions.

Current power-management systems for mobile communications devices typically provide visual indicators of an overall remaining battery charge in the device. In some cases, the devices may also be equipped to issue a sound when battery charge is below a certain level. Such indicators are useful for users of the devices, but are very limited in the way they manage power. Solely on the basis of a single global indicator, the user is left to determine which functions might still be useable before the battery is recharged. Those determinations frequently involve a high level of guesswork by users, who must attempt to estimate when the battery will ultimately be depleted of charge. Often, a user will attempt to use some function of the device only to discover while using the function that there was insufficient power to complete the function, resulting in unexpectedly dropped calls, unexpected interruptions in data transmission, or other premature terminations of functionality.

There is accordingly a need in the art for improved methods and systems of managing power allocations in such devices.

SUMMARY

Embodiments of the invention provide methods of managing power resources of an electronic device. The electronic device has a plurality of device subsystems in communication with a power supply, and an interface in communication with the plurality of device subsystems. A directive is received with the interface to perform a function with the electronic device. A subset of the device subsystems needed to perform the function with the electronic device are identified. For each of the identified subsystems and in response to receipt of the directive, a predicted power-resource quantity needed to perform the function is determined. A determination is made whether sufficient unallocated resources of the power supply are available to accommodate the predicted power-resource quantity for each of the identified subsystems. Respective portions of the available and unallocated resources of the power supply are accordingly allocated for use by respective identified subsystems in accordance with the determined power-resource quantities, with such allocation rendering the respective portions unavailable for use other than by the respective subsystems.

In some instances, the predicted power-resource quantity for each of the identified subsystems is predicted by retrieving a record derived from past-use information of the identified subsystems in performing the function with the electronic device so that data from the record may be applied in determining the predicted power-resource quantities.

For example, in one embodiment, the record comprises a statistical measure of resource usage of the identified subsystems in performing the function. Data from the record may then be applied by determining the predicted power-resource quantity to be greater than a mean value of past usage in performing the function.

In other embodiments, an environmental parameter is measured at a location of the electronic device and applied in determining the predicted power-resource quantities. Examples of environmental parameters that may be used include a temperature or a distance measure of a relay power station from a position of the electronic device. In still other embodiments, a status of a component of the electronic device is determined and applied in making the determinations.

In addition to these different forms of dynamic allocation, static allocation may also be used, with a portion of the resources of the power supply being preallocated for use by at least some of the device subsystems when the directive is received. For instance, the portion may comprise resources of the power supply preallocated for use only by an emergency function. More generally in these embodiments, determining whether sufficient unallocated resources of the power supply are available to accommodate the predicted power-resource quantity for the identified subsystems may comprise determining that at least a portion of the predicted power-resource quantity for at least one of the identified subsystems may be accommodated by the preallocated portion.

After the function has been performed, actual usage of the resources of the power supply may be determined so that the past-use information may be updated in accordance with that determination. In addition, after the function has been performed, unused portions of the allocated portions may be identified and deallocated.

In some embodiments, the electronic may have a battery that functions as at least part of the power supply.

The methods of the invention may be embodied in an electronic device that comprises a processor, a connection to a power supply, a plurality of device subsystems in communication with the power supply, and an interface in communication with the processor and with the plurality of device subsystems. The processor includes instructions, such as in the form of computer-readable code, to implement the methods of the invention.

BRIEF DESCRIPTION OF THE DRAWINGS

A further understanding of the nature and advantages of the present invention may be realized by reference to the remaining portions of the specification and the drawings, wherein like reference labels are used throughout the several drawings to refer to similar components.

FIGS. 2A and 2B provide illustrations of how functionality and subsystems of mobile communications devices may be related;

FIG. 3 is an example of a subsystem allocation table that may be used in an exemplary embodiment of the invention;

DETAILED DESCRIPTION OF EXEMPLARY EMBODIMENTS

Embodiments of the invention provide methods and systems for allocating power in devices. While much of the description herein makes reference to mobile electronic devices or even more specifically to mobile communications device, this is to highlight the particular utility of the invention to managing power in such devices. More generally, though, the methods and systems of the invention may find application in a wide variety of devices that have power-management requirements.

Figure 1A:
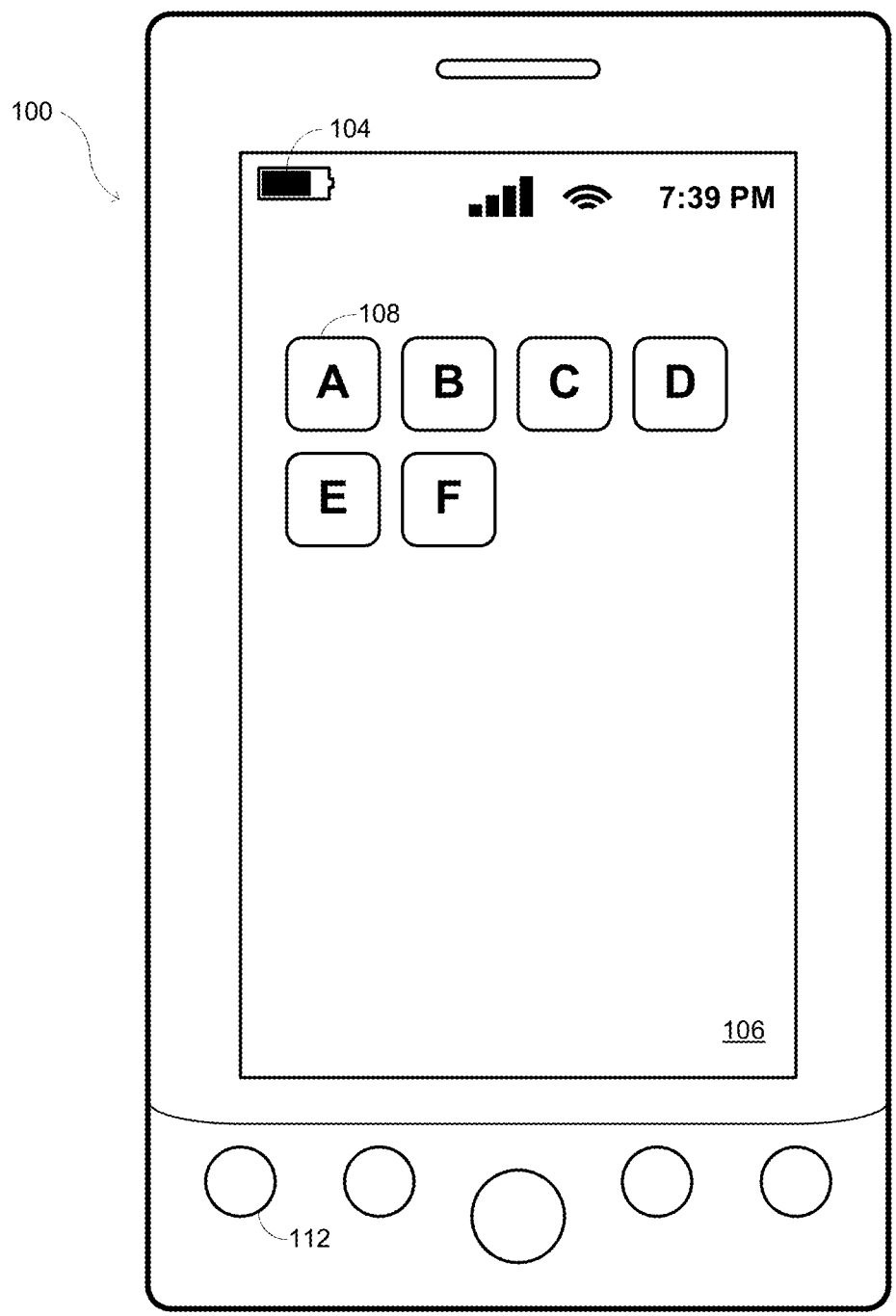
FIG. 1A is a schematic illustration of one example of a mobile communications device with which the invention may be embodied.
Figure 1B:
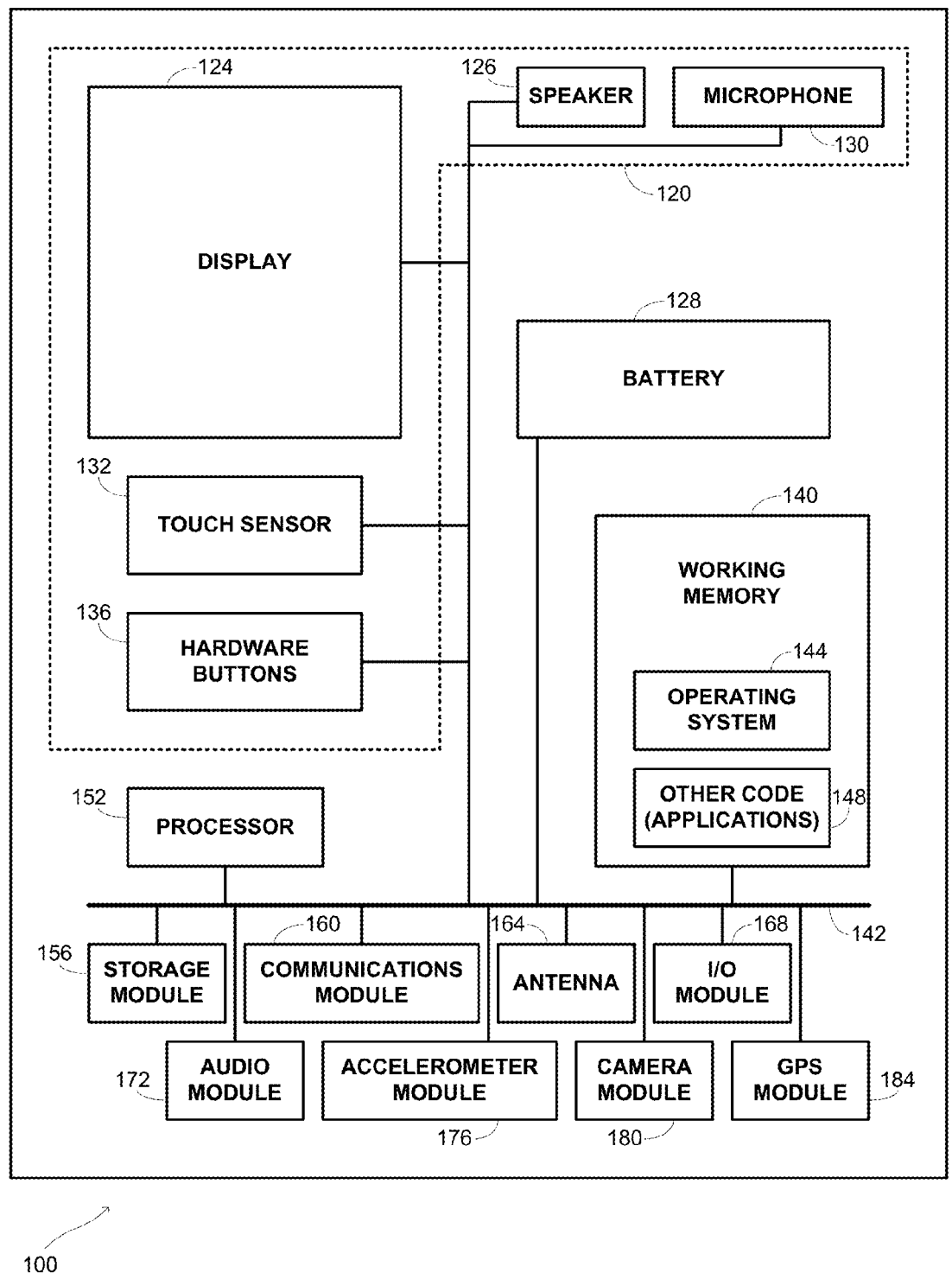
FIG. 1B is a schematic illustration of an internal structure of a mobile communications device with which the invention may be embodied.

For purposes of illustration, FIGS. 1A and 1B provide structural and functional schematic views of a typical mobile communications device 100. The structure shown in FIG. 1A is intended merely to be exemplary since the invention may be embodied not only in any type of mobile communications device, including such devices as mobile telephones, smart phones, pagers, wireless Internet appliances, and the like, but may be embodied in any device that operates by drawing power from a finite but rechargeable source. There are moreover a number of different ways in which users may interact with devices, the example of FIG. 1A including a touchscreen 106 from which a number of applications 108 may be accessed as well as buttons 112. In other devices, keyboards, whether integral with the device, coupled through electrical cables, or presented as virtual keyboards accessed by the touchscreen 106, may be used to interface with the device 100. Similarly, acoustic interactions may be enabled with a speaker and microphone as part of issuing voice commands to the device 100 and receiving responses. The device 100 may also be equipped with communications systems that allow for remote interactions with the device in addition to being used in implementing some of the communications functions of the device 100; examples of such communications systems allow the use of wifi, bluetooth, 3G, and other types of communications protocols known to those of skill in the art. A battery indicator 104 may be included to indicate an overall level of battery resources. A battery indicator of this type is entirely conventional with mobile devices and provides only a very high-level and approximate indication of available battery power.

The functional illustration of FIG. 1B is also intended to be exemplary, with functional components of the device 100 being provided in a generally integrated or separated fashion. While the illustration identifies a number of specific functional components, it is to be understood that alternative devices may lack some of these specific components and may sometimes include other components not specifically described. The methods and systems of the invention are described below in terms of subsystems, each of which may comprise one or may of the components and their interactions with each other, and those methods and systems may be readily adapted to other types of subsystems not specifically described herein.

The illustration of FIG. 1B includes a battery 128 that is coupled with other components of the device 100 through a bus 142 so that each of those other components may draw power from the battery 128 during operation. The components that enable interaction between the device 100 and a user are identified collectively with reference number 120 and include one or more displays 124, one or more touch sensors 132, hardware buttons 136, one or more speakers 126, and one or more microphones 130. The displays 124 allow for visual forms of interaction with user, with input from the user being collected through the touch sensors 132 and/or hardware buttons 136, while the speaker 126 and microphone 130 allow for audio forms of interaction.

Operation of the speakers 126 and microphones 130 may be coordinated with an audio module 172, which is one of several additional modules that may provide different kinds of functionality to the device 100. For instance, a camera module 180 may be interfaced with a camera integral with the device 100 that is used to capture and store images. An accelerometer module 176 may be used to monitor an orientation of the device 100 with respect to gravitational forces. As such, the accelerometer module 176 may conveniently be used to determine whether a display 124 is in a portrait or landscape orientation, and may provide other functionality that relies on knowing the orientation of the device 100. A GPS module 184 may be used to determine a location of the device 100, enabling a wide variety of functions that rely on knowing such a location.

The GPS module 184 is one example of a module that may be comprised by the device 100 that interacts with a communications module 160 by accessing GPS satellite signals. The communications module 160 may additionally be operable to communicate with any of a variety of networks, enabling communication with a cellular network, a wifi network, and the like. Such communications may be coordinated through operation of an antenna 164 to access and generate electromagnetic signals used in communication with the device 100. Other types of communications, notably through electrical cables, may be effect by operation of an input/output module 168 configured for electrical coupling of the device with other devices or peripherals.

All of these and other modules may have their operation coordinated by a processor 152 that interacts with a storage module 156. The processor 152 may be embodied as one or more application-specific integrated circuits ("ASICs"), one or more field-programmable gate arrays ("FGPAs"), or one or more general-purpose processors operative to execute machine-readable instructions in the form of code. Moreover, the processor 152 may include processing acceleration in the form of a digital-signal processor ("DSP") or special-purpose processor.

Software elements are shown as being currently located within working memory 140, including an operating system 144 and other code 148, such as programs to operate the different modules and to implement methods of the invention. It will be apparent to those skilled in the art that substantial variations may be used in accordance with specific requirements. For example, customized hardware might also be used and/or particular elements might be implemented in hardware, software (including portable software such as applets), or both.

FIGS. 2A and 2B generalize the structure of devices on which the invention may be embodied by noting variations in relationships that may exist between the structural modules and the functionality of the devices. In particular, FIG. 2A shows that any device 100 may be configured to perform one or more functions $f_i$ using subsystems $X_j$ of the device 100, but that there is not necessarily an one-to-one mapping of the functions $f_i$ and the subsystems $X_j$, as shown in FIG. 2B. That is, FIG. 2B shows explicitly that each subsystem $X_j$ may be involved in the performance of any number of functions $f_i$, with the converse also being true, namely that the performance of each function $f_i$ may implicate any number of subsystems $X_j$. This may be illustrated with an example, but is generically true. Consider, for instance, a device 100 having a cellular-telephone function. Such a function may invoke a subsystem of the device 100 that operates the display 124, the speaker 126, the microphone 130, the audio module 172, the communications module 160, and the antenna 164. When the same device 100 is equipped with a data function for receiving a wireless protocol, subsystems that may be involved include the display 124, the communications module 160, and the antenna 164.

Power requirements for each of the functions may accordingly vary considerably and the power requirements for each subsystem invoked by the different functions may additionally vary depending on the function to be performed. Consider a typical mobile communications device, which draws approximately 0.5-1.0 mA when in a standby mode. Activation of the display subsystem 124 may draw about 150-250 mA when backlighting is activated. Activation of a speaker/microphone subsystem may draw about 200-300 mA when activated. A cellular-telephone function may thus draw more power from the battery than a data function, with the both the data and cellular-telephone functions additionally requiring involvement of the communications module 160 and the antenna 164 but only the cellular-telephone function involving the audio module 172.

Further complicating the battery requirements for these different functions is the way in which they are actually used by a user. A cellular-telephone function typically draws on the battery for a greater length of time than does a data function, with data functions typically operating for a time on the order of a few hundred milliseconds while cellular-telephone functions operating for a time period on the order of minutes. In addition, the actual time involved with any function may very much depend on the specific usage patterns of the device user. Some users may engage in relatively brief conversations using the cellular-telephone function while other users have unusually heavy data requirements.

Embodiments of the invention account not only for the different power requirements of the subsystems invoked for each function but may also account for the different usage patterns of users. For instance, the device 100 may maintain records like those tabulated in FIG. 3, although the specific manner in which the records are kept may be different from that illustrated in FIG. 3. In this tabulation, the expected total battery requirements of each subsystem $X_j$ are maintained for each function $f_i$. This total is expressed as a product of the current draw from the battery for the particular subsystem and the anticipated time that the subsystem is to be used for the particular function.

There are a number of different ways in which the expected requirements are determined. One of the simplest is simply to monitor actual usage of each subsystem as functions are activated and defining the expected requirement for those functions as the average of actual usage. Such averages may be adjust each time the function is required so that the system requirements specified in a manner like that illustrated in FIG. 3 are not static but instead vary in accordance with changes in usage patterns.

Other methods of determining requirements may apply a variety of scaling factors, such as in cases where the requirement is defined to be 10%, 20%, 50%, or the like above the average. The application of such a scaling factor advantageously accounts for variations in usage from the average so that when power is allocated as described below, there is a greater likelihood that a sufficient allocation will be made both for usages that fall below the average and for usages that are above average.

Still more sophisticated techniques may apply any of several well-known statistical methods to determine the requirements. For instance, rather than simply calculate an average usage, the requirement may be determined by calculating both a mean and standard deviation of the actual usages, setting the requirement at one standard deviation above the mean, at 1.5 standard deviations above the mean, 2.0 standard deviations above the mean, etc. Even greater sophistication can be used by recording the full distribution of usages and assigning the requirements in accordance with statistical confidence levels. For instance, the requirements may be set so that there is 80% confidence, 90% confidence, 95% confidence, or the like that any future initiation of a particular function will have actual usage that is less than the requirement. These are relatively simple examples of the kinds of statistical methods that may be used, with other kinds of statistical methods being readily apparent to those of skill in the art.

It is further noted that it is not necessary that the same methodology be applied for each subsystem or for each function in establishing requirements. For example, if function $f_1$ is considered to be more important than function $f_2$, the requirements for each subsystem involved with performing function $f_1$ might be determined with a greater confidence level than is done with function $f_2$. Merely by way of illustration, this could be the case if a particular device was intended to be more reliable with cellular-telephone functions than with GPS functions so that the requirements for the subsystems involved with cellular-telephone functions are established at a 95% confidence level while those involved with GPS functions are established with only a 75% confidence level.

Similarly, even for a particular function, the requirements for each subsystem may be established in different ways. With a cellular-telephone function, for instance, the speaker, microphone, and audio subsystems may be considered to be more critical than display subsystems so that even though requirements for the display subsystem are established at the mean of actual usage, requirements for the speaker, microphone, and audio subsystems are established at 1.5 standard deviations above the mean of actual usage.

It is noted that the table of FIG. 3 includes requirements for separate subsystems that may be involved in the execution of each function. An alternative, simpler approach is to have a tabulation of the total requirement for each function, i.e. corresponding to the totals of the values in each row of the illustrated table, without maintaining a record of each subsystem requirement. While simpler, such an approach reduces flexibility of responding to user function requests as will become apparent with the description below.

Furthermore, still more sophisticated methodologies may be used in determining the subsystem requirements for particular applications, including the use of such techniques as neural networks, expert systems, genetic algorithms, and the like. For instance, the previous illustrations have been predicated on determining subsystem requirements from past usage without regard to temporal variations in usage that may exist. A user might, for example, tend to use a particular function of the device for a longer or shorter time than average at certain times of the day, at certain times of the week, or at certain times of the month. This additional variable may be accommodated by these more sophisticated techniques so that the device takes account of when the function is being requested by the user to develop a more precise determination of subsystem requirements. Still other variables may be accommodated by incorporating pattern-recognition techniques into the code that makes use of the determinations. Examples of patterns that might be identified and incorporated into the determinations include such things as identifying when users tend to call particular sequences of functions in order and function calls that are related by pattern to unusually brief subsequent function calls. For instance, a user might predictably tend to follow a cellular-telephone function to a particular number with an unusually lengthy data function so that when that particular sequence occurs, the device allocates increased battery resources when the data function is called.

Figure 4:
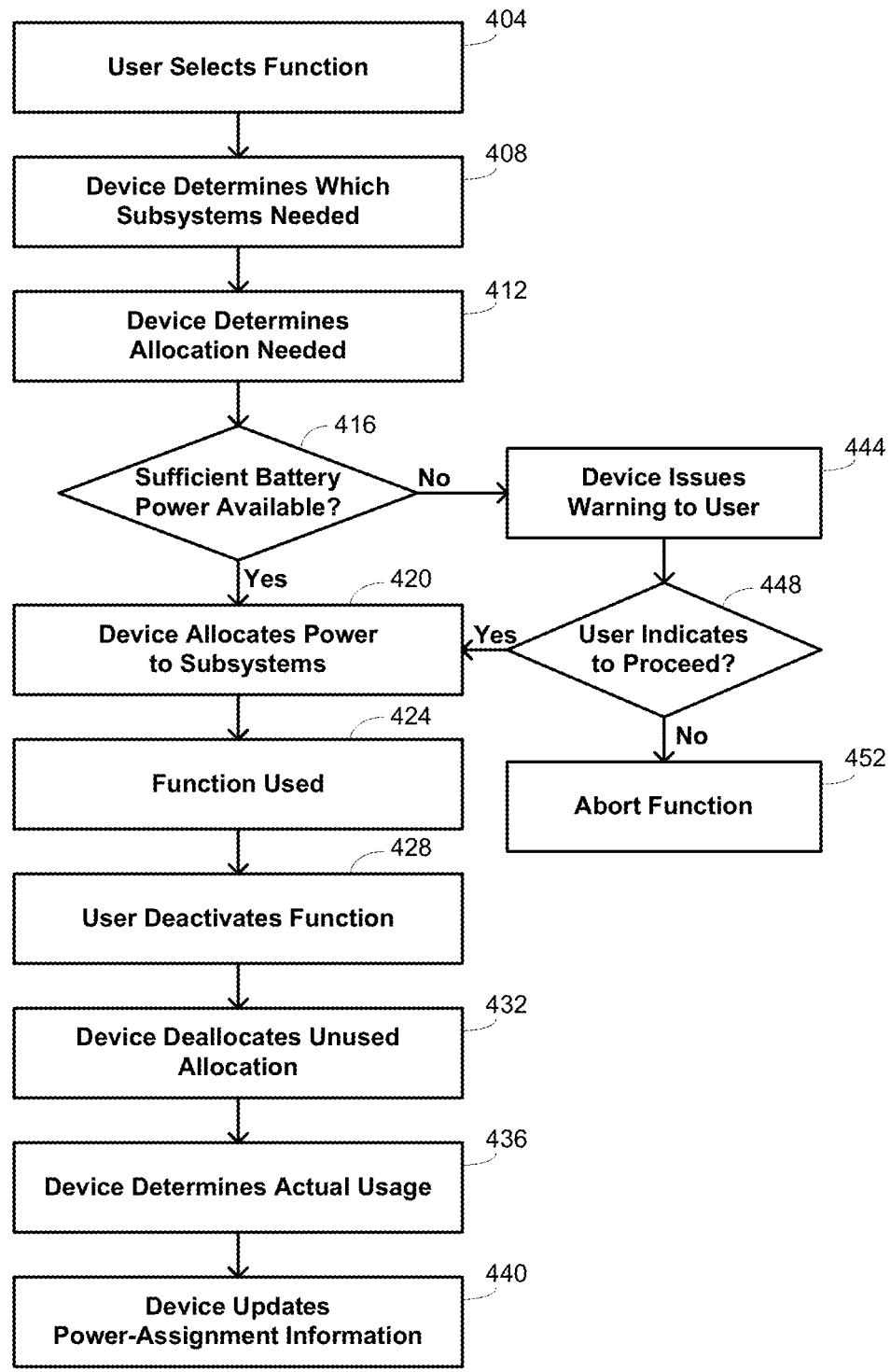
FIG. 4 is a flow diagram summarizing methods of managing power in a mobile communications device with a dynamic allocation according to embodiments of the invention.

With the device maintaining such requirements, and in many embodiments continually updating such requirements based on actual usage, allocation of battery resources may proceed as outlined with the flow diagram of FIG. 4. In considering the flow diagram, it is noted that the identification of specific steps in the diagram is not intended to be limiting, nor is the order in which the steps are presented. Specifically, the flow diagram defines one particular embodiment and alternative embodiments may omit some of the steps indicated, may include additional steps that are not identified, and/or may vary the order of some of the steps.

The illustrated embodiment begins with the user selecting a function to be performed by the device at block 404. The device determines which subsystems are needed at block 408 in accordance with a stored mapping of functions to subsystems, such as may be maintained on the storage module 156. For instance, when the user selects a cellular-telephone function at block 404, the device 100 may determine at block 408 that display, speaker/microphone, audio, and communications subsystems are needed to perform the function. The allocation requirement is retrieved at block 412 using a table like that described in connection with FIG. 3 or an alternative mechanism for storing such information.

Rather than simply initiate the function as in conventional devices, a procedure that runs a risk that the user will have the function interrupted when the battery discharges, battery power resources are allocated for performing the function in accordance with the invention. Moreover, such allocation takes place dynamically in the specific sense that the allocation is made either at the time the function is activated or while the function is being performed. As will be evident from the description below, this provides considerably greater flexibility than a static allocation in which battery resources would have been allocated to specific functions in advance to those functions being called.

In some embodiments, such a tabulated allocation requirement is merely a starting point in determining the allocation requirement at block 412. Other factors may be applied to modify the tabulated requirement upwards or downwards by accounting for current circumstances of the device. Such factors can include environmental factors such as ambient temperature measurements since such environmental factors may affect the rate of power consumption by the battery. They can also include location factors such as the known location of power stations since such factors may affect the speed of communications with the device and thereby affect the resources that the function will require. Other examples of factors that may affect the allocation determinations include processor speed, evaluation of the number of threads running, the current battery cycle, evaluation of user-configurable inputs, and the like.

The device 100 accordingly determines at block 416 whether sufficient battery power is available to perform the function according to the requirements determined at block 412. Consistent with the description of FIG. 3, those requirements generally ensure that the function will complete, taking into account not only the manner in which limited resources need to be assigned to the specific subsystems, but also taking account of the user's historical usage patterns.

While some embodiments may implement the determination at block 416 in a relatively straightforward fashion by simply adding the total requirements for all subsystems for the desired function and determining whether that total is less than the available battery resources, other embodiments use more efficient determinations. Those embodiments provide an illustration why maintaining records of specific subsystem requirements may be advantageous. In some instances, there may be overlap of functionality so that a particular subsystem may simultaneously satisfy the requirements of multiple functions. Consider, for example, a user who has previously activated function $f_1$ of FIG. 3. Suppose that no other functions are active and that a power allocation has previously been made in accordance with that function so that battery resources of 53.2 mA h have been allocated for subsystem $X_1$ and 224.6 mA h have been allocated for subsystem $X_2$. When the user activates function $f_2$, the device determines that resources of 12.4 mA h are required for subsystem $X_1$ (in addition to 395.0 mA h for subsystem $X_3$). One embodiment might aim to allocate an additional 12.4 mA h of battery resources to subsystem $X_1$.

But suppose that subsystem $X_1$ can simultaneously satisfy the requirements of functions simultaneously satisfy the requirements of functions $f_1$ and $f_2$. One example of such a subsystem would be a display subsystem in which the display is backlit during execution of the function. The device need not assign a full additional 12.4 mA h to subsystem $X_1$ in order to accommodate function $f_2$ if the full 53.2 mA h of allocation for function $f_1$ have not been used. Thus, the determination at block 416 may consider (1) whether any of the subsystems involved in the requirements for the user's desired function currently have an allocation; (2) whether those subsystems are capable of providing simultaneous functionality to multiple functions; and (3) what the difference is between what remains as allocated to those subsystems and what the requirements of the newly called function are. Depending on the specific actual usage at the time the function is called by the user, this may result in a determination of any value between zero and the tabulated requirement that is compared by the device 100 at block 416. It is noted that it is possible under some particular scenarios that this analysis may determine that the function called by the user may be completed without any additional allocation of battery resources.

In some embodiments, a determination at block 416 that currently battery levels are insufficient to accommodate the selected function may result in aborting the function directly. The drawing illustrates an alternative, though, in which the device instead issues a warning to the user at block 444 that there may be insufficient battery power, allowing the user to determine whether to proceed with the function in spite of the risk that it will not be possible to complete it. Such a determination by the user may be appropriate, for instance, when the user knows that the function will be unusually short in duration. Thus, at block 448, the user indicates whether to proceed, with the function being aborted at block 452 if the user decides the limitations on available battery resources makes the risk of interruption of the function too great.

Figure 5A:
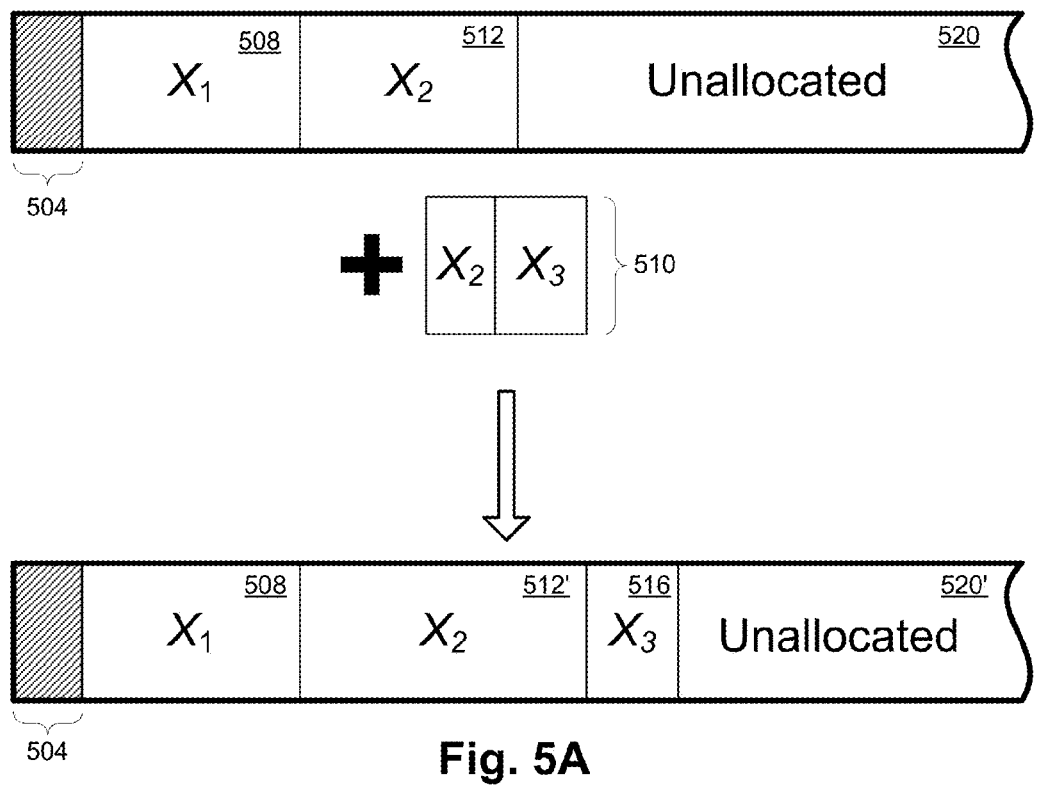
FIGS. 5A-5C provide schematic illustrations of dynamic power allocation in mobile devices according to the embodiments of FIG. 4.

If a determination is made that there are sufficient battery resources available, power is allocated to the required subsystems on a dynamic basis at block 420. How the allocation may be accomplished is illustrated with FIGS. 5A and 5B. In each of these drawings, a horizontal bar is used to denote battery resources, including portions of the battery that are currently expended, portions that are currently allocated to subsystems, and portions that are currently available and unallocated. FIG. 5A, for example, represents a battery that is fully charged, with the top portion of the drawing showing certain assignments. Portion 504 of the battery resources is a statically pre-allocated portion that is reserved for emergency functions. Specifically, this portion of the battery resources may be set aside as unavailable for routine use so that the device 100 maintains sufficient battery resources for a user to make an emergency call, send an emergency text message, or the like. This allows a user to make an emergency use of the device 100 even when discretionary availability of the battery resources has been exhausted. In some embodiments, this preallocation of a portion of battery resources may be tied to a particular emergency function of the device, such as where the emergency function can only be used to call a preprogrammed emergency number (e.g., "911"), ensuring that the emergency allocation is not subject to misuse. It provides an example of a more general class of embodiments discussed below in which the device 100 is configured to use both static and dynamic allocations of battery resources.

In addition to the emergency allocation, the battery depicted at the top of FIG. 5A is in a state where portions of the battery resources have already been allocated to subsystems $X_1$ and $X_2$, identified by reference numbers 508 and 512. The remainder 520 of the fully charged battery is, at this point, not allocated to any particular subsystem. Allocation 510, which includes allocations to both subsystems $X_2$ and $X_3$ results from the determinations made at block 412 and 416 of FIG. 4. In this example, the needed allocation is well within the available resources of the battery. Thus, when the dynamic allocation is made at block 420 of FIG. 4, the configuration shown at the bottom of FIG. 5A results. The battery at this point is still fully charged, maintains the emergency preallocation 504, and maintains the prior dynamic allocation 508 to subsystem $X_1$, but the allocation 512 to subsystem $X_2$ is increased to allocation 512' to accommodate the needs of the called function and a new allocation 516 to subsystem $X_3$ is dynamically made. The unallocated portion of the battery resources accordingly decreases from what is identified by reference number 520 at the top of the drawing to what is identified by reference number 520' at the bottom of the drawing.

Figure 5B:
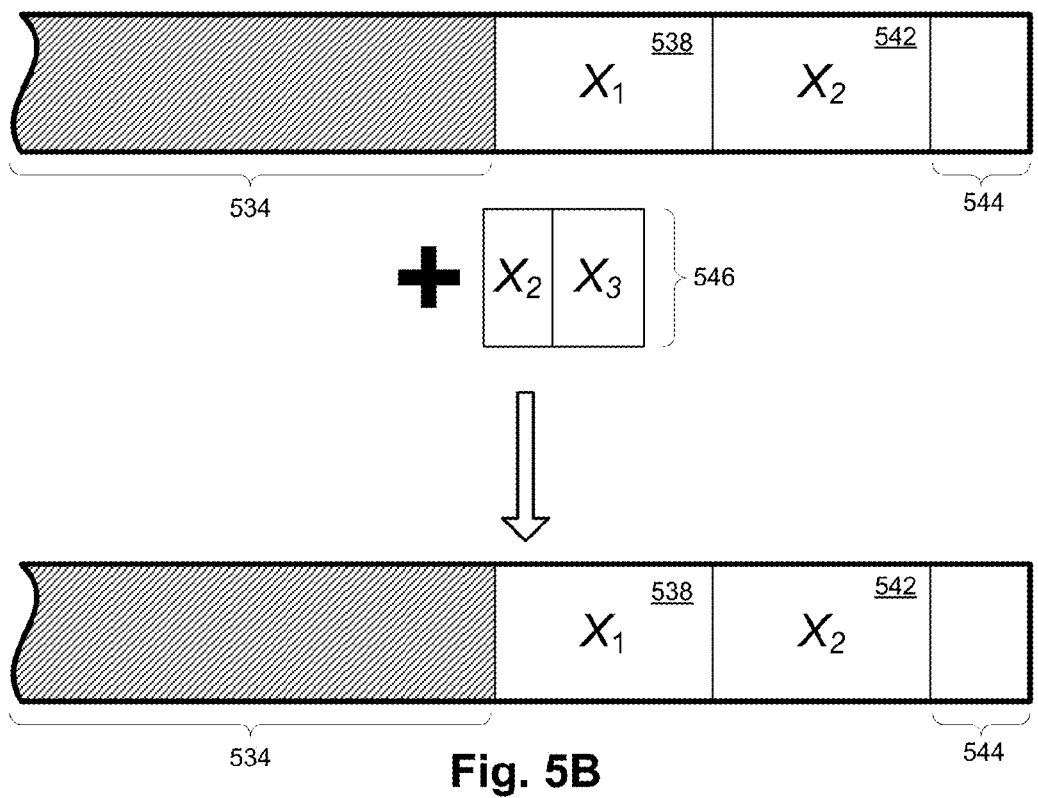

FIG. 5B provides an illustration when most of the battery is discharged, but with the same dynamic allocations considered for FIG. 5A. The top portion of the drawing depicts the battery, with the emergency allocation and discharged portions of the battery denoted collective by reference number 534 as unavailable for use. The same prior dynamic allocation as in FIG. 5A has been made, with the allocations to subsystems $X_1$ and $X_2$ being denoted with reference numbers 538 and 542. The available and unallocated portion 544 is considerably smaller than in the example of FIG. 5A, such that there is insufficient unallocated available battery resource to accommodate the allocation 546 needed to respond to a user function request. In this example, then, no allocation occurs and the function is aborted as indicated at block 452 of FIG. 5B.

The dynamic allocations made in accordance with embodiments of the invention also permit implementation of a form of energy-allocation garbage collection. Returning to FIG. 4, after the function has been used at block 424 and deactivated by the user at block 428, the device may deallocate unused portions of the dynamic allocation at block 432. Because the dynamic allocation makes use of predictive techniques based on past usage of certain device functions, and particularly in those instances where the predictive techniques are tailored to be generous in ensuring sufficient battery resources are allocated, there may be instances where fewer resources are used than were allocated. By deallocating previously allocated battery resources, those resources may be reassigned to subsystems for the execution of other functions.

Figure 5C:
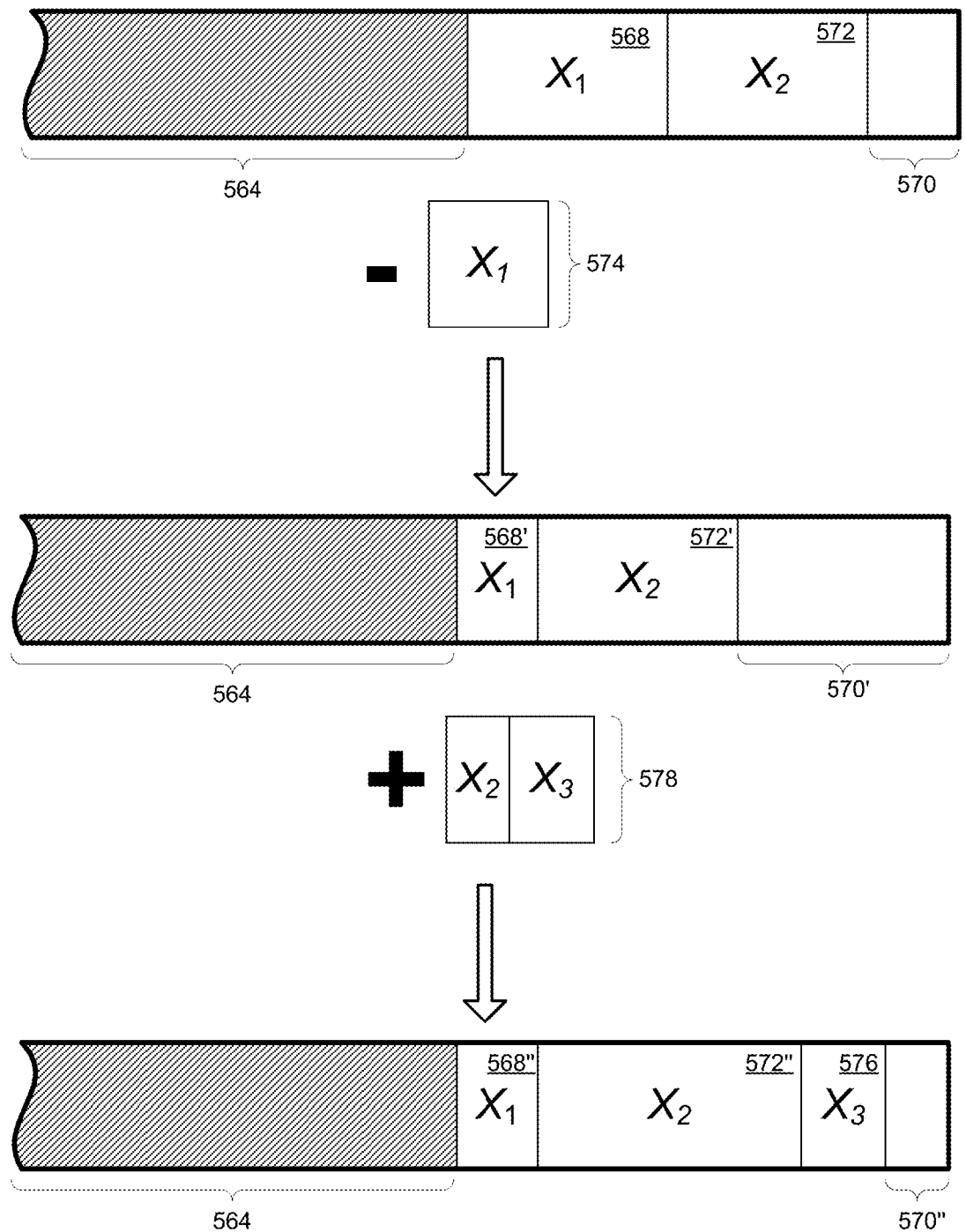

This is illustrated with FIG. 5C in an example where a significant portion of battery resources are discharged as indicated by reference number 564 in the top portion of the drawing (with a portion potentially being allocated to an emergency function instead of being discharged). The available battery resources are partly allocated to subsystems $X_1$ and $X_2$ as indicated by reference numbers 568 and 572. The available and unallocated battery resources 570 are insufficient to accommodate subsystem requirements 578 for a certain function if called when the allocation is in the state indicated by the top portion of the drawing. However, if part of the allocation of $X_1$ is for a function that terminates before the subsequent function call, releasing the unused $X_1$ allocation 574, the battery resources may be sufficient. The intermediate portion of the drawing shows the allocation status when the unused $X_1$ allocation is deallocated, with the only allocations remaining being those for $X_1$ 568' at a reduced amount and for $X_2$ 572'. The resulting available and unallocated battery resources 570' are then sufficient to accommodate the allocation 578 for the subsequent function call. As the bottom portion of the drawing shows, the allocation 578 may then be accommodated, with the battery resources having allocations to subsystem $X_1$ 568", to subsystem $X_2$ 572", and to subsystem $X_3$ 576, and with the available and unallocated portion 570" being reduced accordingly.

After deallocation of unused allocations at block 432 of FIG. 4, the device may determine the actual usage of the subsystems at block 436. This permits the device to update the power-assignment information at block 440, such as by recalculating a mean usage for each subsystem for the called function or by applying any of the more sophisticated methodologies described above. This type of updating allows the subsystem requirements maintained as in the table of FIG. 3 to continually account for actual usage patterns by the user. If the actual usage was less than the device had predicted, the nominal allocation for that function may accordingly be decreased. Updating may be slightly more complex in instances where the actual usage was greater than predicted if the function was not fully completed because the device exhausted the battery resources or the user modified his use of the function because of concerns about the level of availability of battery resources. Using the actual resources expended for the function for the updating at block 440, though, even if the function terminates prematurely because battery resources are exhausted, will tend to move the assignments in a direction approaching the appropriate usage predictions.

The following block of code is provided as an illustration of an implementation that may be used in one exemplary embodiment:

```
struct pwr_req {
    int max_pwr,
    int min_pwr,
    int actual_pwr,
    struct device *dev,
};
struct pwr_register_device pwr = {
    .max_pwr = 5, /* max power in milliwatts */
    .min_pwr = 1, /* min power in milliwatts */
    .dev = (struct device *)mydev,
}
/*
* Acquire a lock for power for device mydev
*
* The function returns 0 on success, 1 on failure.
* A failure condition is one in which the actual power requested in the
* palloc function is outside of the range requested (pwr->min_pwr ->
pwr->max_pwr)   */ int pwr_acquire_lock (void) {
    palloc (&pwr);
    if (pwr->actual_pwr >= pwr->min_pwr && pwr->actual_pwr <=
pwr->max_pwr) {
        printf ("Successfully registered %d milliwatts for device %s\n",
pwr->actual_pwr, pwr->dev.name);
        return 0;
    }
    return 1;
}
/*
* Release a lock for power for device mydev
*
* The function returns 0 on success, non-zero on failure.
* The pfree call frees the locked power requested in pwr_acquire_lock
*/ int pwr_release_lock (void) {
    return (pfree (&pwr));
}
```

While the above description has provided examples of the use of dynamic allocation of power resources, other embodiments of the invention hybridize the use of static and dynamic allocations. Such embodiments are illustrated with the flow diagram of FIG. 6, with the following description also making reference to FIGS. 7 and 8 to illustrate how the hybrization may be implemented.

Figure 6:
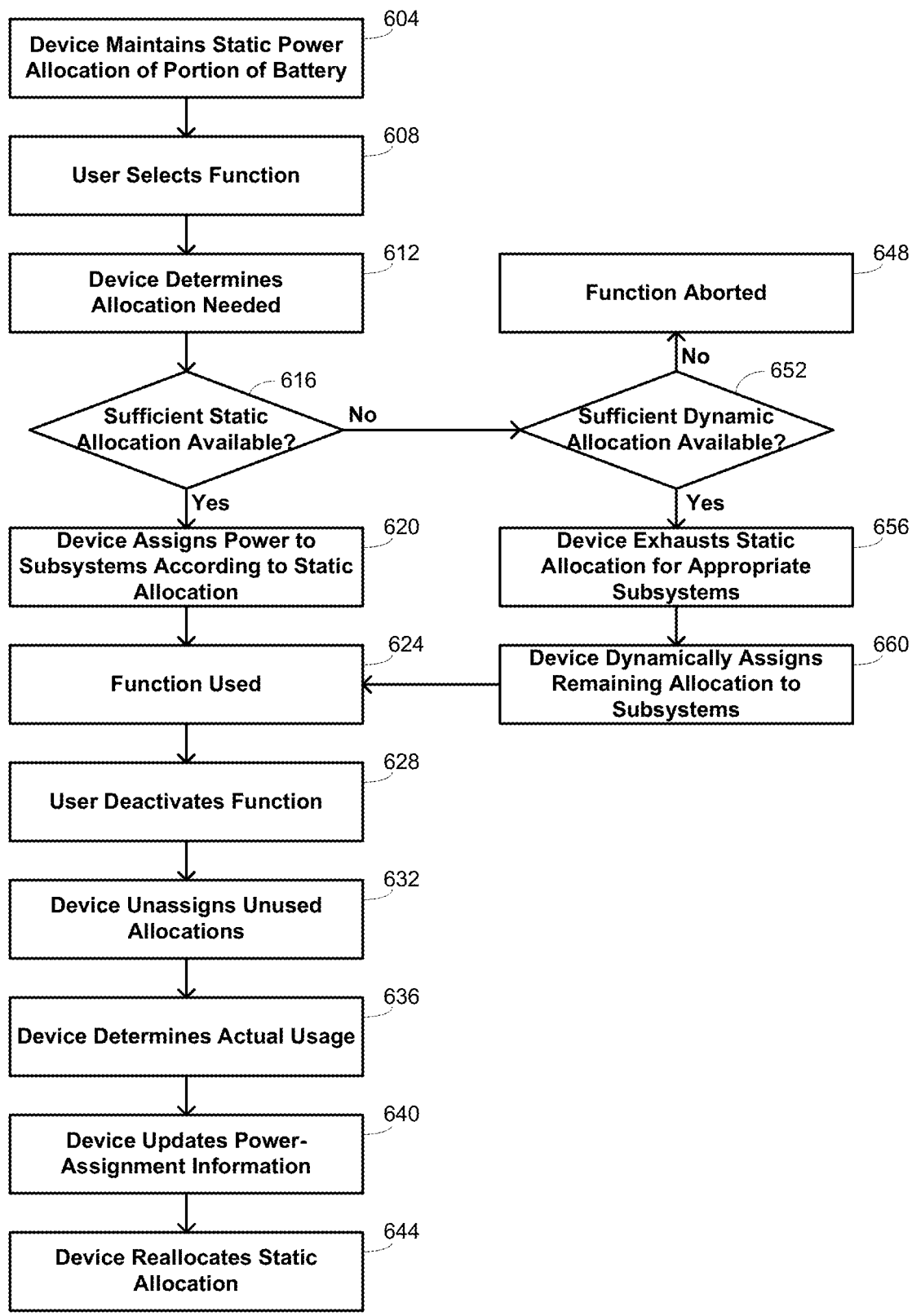
FIG. 6 is a flow diagram summarizing methods of managing power in a mobile communications device with a hybrid of dynamic and static allocation according to embodiments of the invention.
Figure 7:
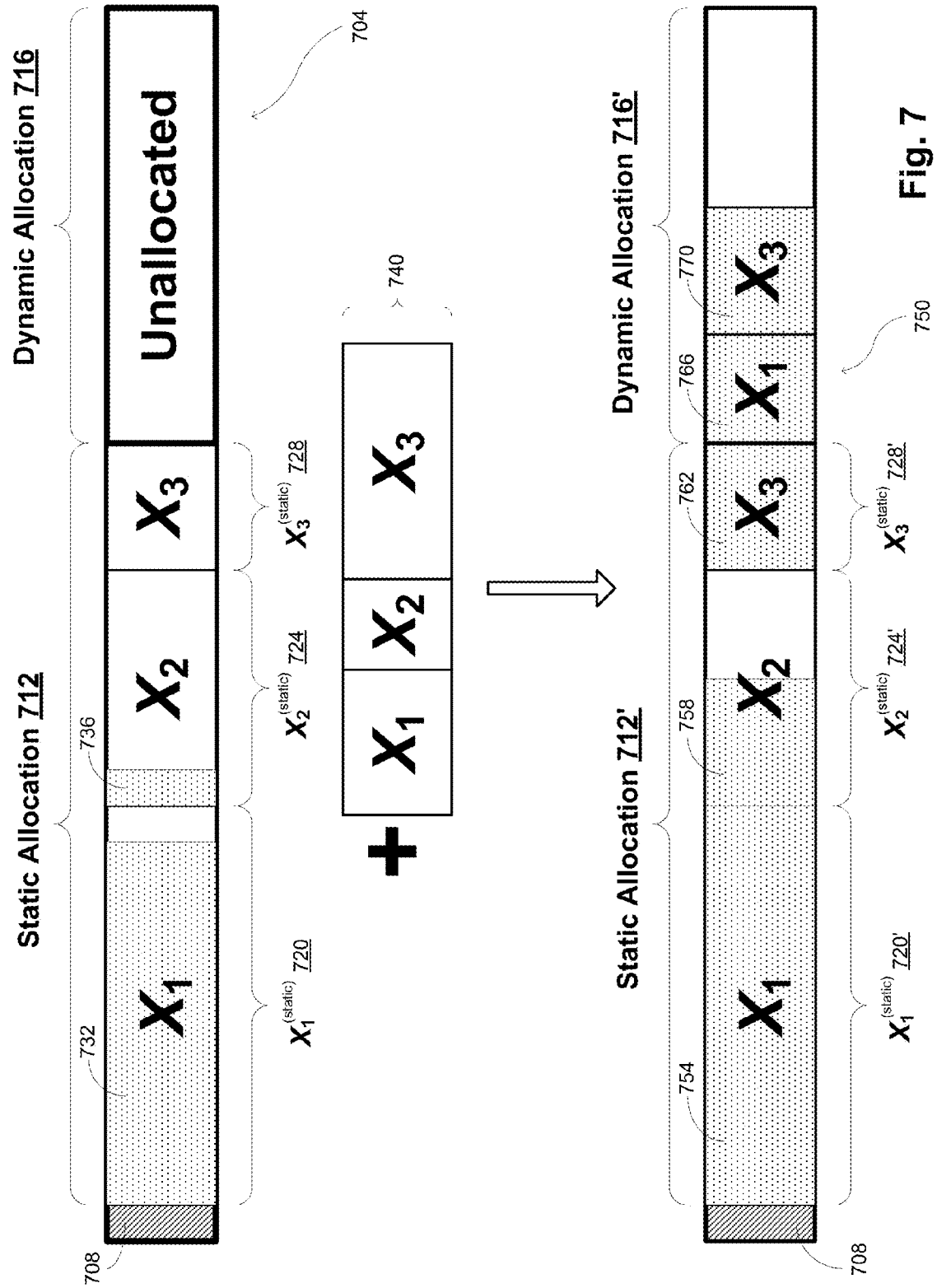
FIG. 7 provides a schematic illustration of power allocation using a hybrid of static and dynamic allocation according to the embodiments of FIG. 6.

At block 604 of FIG. 6, the device maintains a static power allocation of a portion of the battery resources as illustrated in the top portion of FIG. 7. In this illustration, the entire battery resources 704 are divided as follows: A small portion 702 is statically reserved for an emergency function; a first portion 712 is reserved for static allocation; and a second portion 716 is reserved for dynamic allocation. The relative sizes of the static and dynamic allocation portions 712 and 716 may vary in different embodiments and may be defined in different ways in different embodiments, affecting the way in which battery discharges and recharging are handled. For instance, if the allocations are defined so that a certain absolute portion of the battery resources are defined for dynamic allocation, discharges may be taken from all of the static allocation before any are taken from the dynamic allocation. This is the configuration illustrated in FIG. 7. Conversely, if the allocations are defined so that the relative sizes of the static and dynamic allocations are to be maintain regardless of the battery charge level, battery discharge may result in smaller allocations for both the static and dynamic portions even before complete exhaustion of either.

In the illustration, the dynamic portion 716 is currently available and unallocated while the static portion 712 has allocations to subsystem $X_1$ 720, to subsystem $X_2$, and to subsystem $X_3$ 728. Such a static allocation means that those portions of the battery resources are reserved to those subsystems when they are called, with the stippled parts of the drawing showing that some of the static allocation has been assigned to $X_1$ (reference number 732) and to $X_2$ (reference number 736). The size of these assignments has been exaggerated for purposes of illustration.

When a user selects a function at block 608 of FIG. 6, the device determines the allocation needed at block 612 in the same manner as described previously for purely dynamic allocations. This may include consideration of numerous factors such as processor speed, run-time estimates, number of threads currently running on the device. ambient temperature measurements, current battery cycle, known location of power stations, user-configurable inputs, and the like. Thus, while the power designations may have a static component as illustrated in FIG. 7, the method retains a dynamic capability in determining allocations by considering factors on the fly. Assignment of battery resources may proceed preferentially with static allocations, leaving the more flexible dynamic allocations to accommodate circumstances when battery power is low. Thus, at block 616, a check is made whether sufficient static allocation for the requirements of the function are available. If so, the device assigns power to the subsystems according to the static allocation at block 620.

If there is insufficient static allocation available, a check is made at block 652 whether sufficient dynamic allocation is available for any allocation that cannot be accommodated by the static allocation. If not, the function is aborted at block 648, although provision may be made as described in connection with FIG. 4 for a user override by warning the user that sufficient battery resources may be unavailable. If there are sufficient resources available even as a combination of static and dynamic allocation, appropriate assignments may be made at blocks 656 and 660, with the device exhausting the static allocation for the appropriate subsystems at block 656 and dynamically assigning the remaining allocation at block 660.

This is illustrated in the remaining part of FIG. 7, with the necessary allocation determined at block 612 of FIG. 6 being illustrated with the example provided by reference number 740. In this instance, the necessary allocation involves three subsystems, with the static allocation 712 having insufficient resources for the full required allocation to subsystems $X_1$ and $X_3$ but having sufficient resources for subsystem $X_2$. The resulting allocation, shown in the lower part of the drawing, thus includes: the emergency allocation 708; a static allocation portion 712' with the full portion 754 of the static allocation for $X_1$ 720' assigned, a portion 758 of the static allocation for $X_2$ 724' assigned, and the full portion 762 of the static allocation for $X_3$ 728' assigned; and a dynamic allocation portion 716' with $X_1$ and $X_3$ respectively assigned allocations 766 and 770. In this assignment, the total static and dynamic allocation for $X_1$ represented by 754 and 762 is equal to the previously assigned portion 732 and the $X_1$ portion of the determined allocation 740; the static allocation 758 for $X_2$ corresponds to the previously assigned portion 736 and the $X_2$ portion of the determined allocation 740; and the total static and dynamic allocation for $X_3$ represented by 762 and 770 is equal to the $X_3$ portion of the determined allocation 740.

After the function is used at block 624 with the allocations, the user deactivates the function at block 628 and unused allocations are unassigned at block 632. A determination of the actual device usage at block 636 permits the device to update the power-assignment information at block 640 in the same manner that was previously described.

In these embodiments, while the total allotment for static allocation may be fixed, the individual allocations for different subsystems may be reassigned, again reflecting the hybridization with dynamic allocation. Specifically, the relative static allocations may determined according to actual usage and reallocated in accordance with that actual usage. There are a number of techniques that may be used, one of which simply assigns the relative static allocations according to actual usage of the different subsystems. For instance, suppose that the past usage of subsystem $X_k$ is denoted by $U_k$, with the total usage of all subsystems being $U=\Sigma_k U_k$, and the fraction of the total static allocations for each subsystem $X_k$ denoted by $\alpha_k$ with $\Sigma_k \alpha_k \equiv 1$. When a particular function is called and results in usage for subsystems $X_1, X_2, \ldots, X_m$ denoted by $\Delta U_1, \Delta U_2, \ldots, \Delta U_m$, the reallocation of static allocations at block 644 may proceed by applying the following:

$$U \rightarrow U' = U + \sum_m \Delta U_m$$

$$\alpha_m \rightarrow \alpha'_m = \frac{\alpha_m U + \Delta U_m}{U'}.$$

Such a reallocation preserves the constraint that $\Sigma_k \alpha_k \equiv 1$ but changes the specific allocations to different subsystems in a direct way that accounts for actual usage of those subsystems. This is a relatively simple method of performing the reallocation and those of skill in the art will understand that more complex methods may be used in alternative embodiments. For instance, environmental factors such as ambient temperature measurements could be taken into account so that the scope of the reallocation is reduced if the temperature was unusually low, resulting in an unusually high usage of battery resources to complete the function. Similar adjustments may be included for any of a host of other dynamic factors that affect the actual usage, including such factors as the location of power stations, the number of threads running, and other factors described above.

Figure 8:
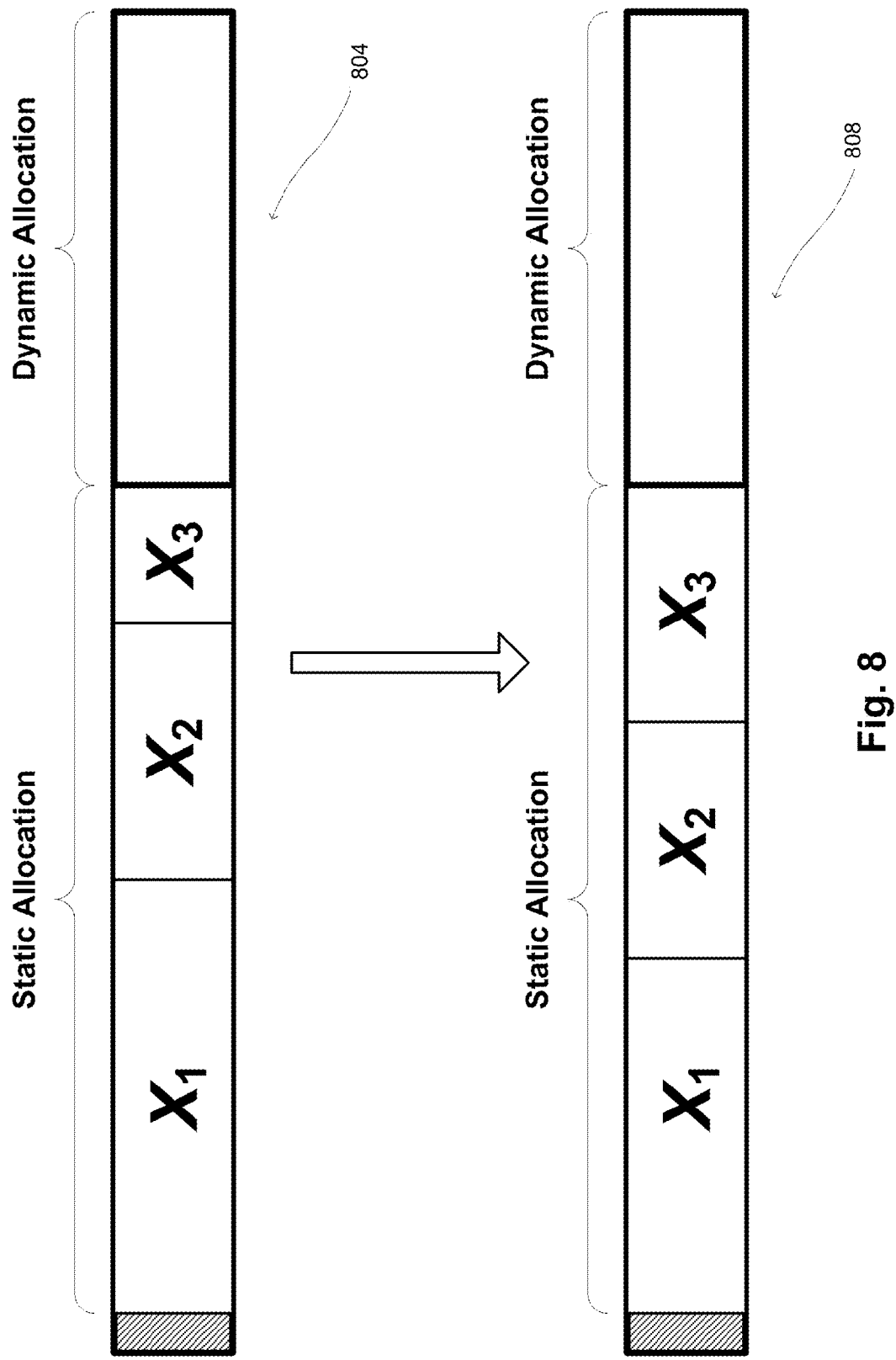
FIG. 8 provides a schematic illustration of dynamic reassignment of a static power allocation according to embodiments of the invention.

The reallocation at block 644 of FIG. 6 is illustrated in FIG. 8. In this simple illustration, battery resources having initial allocations 804 divided among static and dynamic allocations have the static allocations reassigned to the allocation 808. The portion of battery resources reserved to dynamic allocation are unchanged, but there is a reassignment of the specific subsystem allocations so that $X_2$ is given a smaller allocation and $X_3$ is given a larger allocation.

While much of the description above has illustrated aspects of the invention in a device that operates with direct current from a battery, it is noted that the invention may also be embodied in contexts that use other types of power, such as an ac-power device. Consider a device that includes four wired Ethernet connections each consuming 1 W of power, four wireless Ethernet connections each consuming 1 W of power, a CPU consuming 1 W of power, random-access memory consuming 1 W of power, three storage devices each consuming 1 W of power, two USB connections each consuming 1 W of power, and an SDCard consuming 1 W of power. The total power to support everything is 20 W, but it may be that only 15 W of ac power are available. The same process for dynamic allocation as described above may be applied in such embodiments at the system level, determining what is and what is not active or needed at any particular time. Profiling as described above may be leveraged for power assignment on power-up as well.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of managing power resources of an electronic device having a plurality of device subsystems in communication with a power supply, and an interface in communication with the plurality of device subsystems, the method comprising:
    reserving a static allocation of power, wherein the static allocation of power is an assigned power allocation for one or more predetermined device subsystems;
    reserving a dynamic allocation of power, wherein the dynamic allocation of power is an unassigned power allocation;
    receiving a directive with the interface to perform a function with the electronic device;
    identifying a subset of the plurality of device subsystems needed to perform the function with the electronic device;
    determining, for each of the identified subset of the device subsystems and in response to receipt of the directive, a predicted power-resource quantity needed to perform the function, wherein determining a predicted power-resource quantity comprises:
        determining whether an identified device subsystem has a current power allocation;
        determining whether the identified device subsystem with the current power allocation is capable of providing simultaneous functionality to multiple functions;
        determining a difference between what is currently allocated and what is required for the function;
        determining whether sufficient unallocated resources of the static allocation are available to accommodate the predicted power-resource quantity for each of the identified device subsystems;
    if there is sufficient unallocated resources of the static allocation available, allocating respective portions of the static allocation for use by respective identified device subsystems in accordance with the determined power-resource quantities, wherein allocating the respective portions renders the respective portions unavailable for use other than by the respective, identified device subsystems; and if there is not sufficient unallocated resources of the static allocation available, allocating at least a portion of the dynamic allocation for use by respective identified device subsystems in accordance with the determined power-resource quantities.

2. The method recited in claim 1 wherein determining the predicted power-resource quantity for the each of the identified subsystems comprises:

retrieving a record derived from past-use information of the each of the identified subsystems in performing the function with the electronic device; and applying data from the record in determining the predicted power-resource quantity for the each of the identified subsystems.

3. The method recited in claim 2 wherein the record comprises a statistical measure of resource usage of the each of the identified subsystems in performing the function with the electronic device.

4. The method recited in claim 3 wherein applying data from the record in determining the predicted power-resource quantity for the each of the identified subsystems comprises determining the predicted power-resource quantity to be greater than a mean value of past usage in performing the function with the electronic device.

5. The method recited in claim 2 wherein determining the predicted power-resource quantity for the each of the identified subsystems further comprises:

measuring an environmental parameter at a location of the electronic device; and applying the measured environmental parameter in determining the predicted power-resource quantity for the each of the identified subsystems.

6. The method recited in claim 5 wherein the measured environmental parameter comprises a temperature.

7. The method recited in claim 5 wherein the measured environmental parameter comprises a distance measure of a relay power station from a position of the electronic device.

8. The method recited in claim 2 wherein determining the predicted power-resource quantity for the each of the identified subsystems further comprises:

determining a status of a component of the electronic device; and applying the status in determining the predicted power-resource quantity for the each of the identified subsystems.

9. The method recited in claim 2 further comprising: determining actual usage of the resources of the power supply after the function has been performed; and updating the past-use information in accordance with the determined actual usage.

10. The method recited in claim 1 wherein a portion of the resources of the power supply are preallocated for use by at least some of the device subsystems when the directive is received.

11. The method recited in claim 10 wherein the portion comprises resources of the power supply preallocated for use only by an emergency function.

12. The method recited in claim 1 wherein the electronic device comprises a handheld communications device.

13. The method recited in claim 1 further comprising: identifying unused portions of the allocated portions after the function has been performed; and deallocating the identified unused portions.

14. The method recited in claim 1 wherein the electronic device further has a battery that functions as at least part of the power supply.

15. An electronic device comprising:

a processor;

a connection with a power supply;

a plurality of device subsystems in communication with the power supply and the processor; and an interface in communication with the processor and with the plurality of device subsystems, wherein the processor has:

instructions to reserve a static allocation of power, wherein the static allocation of power is an assigned power allocation for one or more predetermined device subsystems;

instructions to reserve a dynamic allocation of power, wherein the dynamic allocation of power is an unassigned power allocation;

instructions to receive a directive with the interface to perform a function with the electronic device;

instructions to identify a subset of the predetermined device subsystems needed to perform the function with the electronic device;

instructions to determine, for each of the identified subset of device subsystems and in response to receipt of the directive, a predicted power-resource quantity needed to perform the function, wherein determining a predicted power-resource quantity comprises:

instructions to determine whether an identified device subsystem has a current power allocation;

instructions to determine whether the identified device subsystem with the current power allocation is capable of providing simultaneous functionality to multiple functions;

instructions to determine a difference between what is currently allocated and what is required for the function to be performed;

instructions to determine whether sufficient unallocated resources of the static allocation are available to accommodate the predicted power-resource quantity for each of the identified device subsystems;

if there is sufficient unallocated resources of the static allocation available, instructions to allocate respective portions of the static allocation for use by respective identified device subsystems in accordance with the determined power-resource quantities, wherein allocating the respective portions renders the respective portions unavailable for use other than by the respective identified device subsystems; and if there is not sufficient unallocated resources of the static allocation available, instructions to allocate at least a portion of the dynamic allocation for use by respective identified device subsystems in accordance with the determined power-resource quantities.

16. The electronic device recited in claim 15 further comprising a storage device in communication with the processor, wherein the instructions to determine the predicted power-resource quantity for the each of the identified subsystems comprise:

instructions to retrieve a record from the storage device, the record derived from past-use information of the each of the identified subsystems in performing the function with the electronic device; and instructions to apply data from the record in determining the predicted power-resource quantity for the each of the identified subsystems.

17. The electronic device recited in claim 16 wherein the record comprises a statistical measure of resource usage of the each of the identified subsystems in performing the function with the electronic device.

18. The electronic device recited in claim 17 wherein the instructions to apply data from the record in determining the predicted power-resource quantity for the each of the identified subsystems comprise instructions to determine the predicted power-resource quantity to be greater than a mean value of past usage in performing the function with the electronic device.

19. The electronic device recited in claim 16 further comprising a sensor in communication with the processor, wherein the instructions to determine the predicted power-resource quantity for the each of the identified subsystems further comprise:
   instructions to measure an environmental parameter at a location of the electronic device with the sensor; and
   instructions to apply the measured environmental parameter in determining the predicted power-resource quantity for the each of the identified subsystems.

20. The electronic device recited in claim 19 wherein the measured environmental parameter comprises a temperature.

21. The electronic device recited in claim 19 wherein the measured environmental parameter comprises a distance measure of a relay power station from a position of the electronic device.

22. The electronic device recited in claim 16 wherein the instructions to determine the predicted power-resource quantity for the each of the identified subsystems further comprises:
   instructions to determine a status of a component of the electronic device; and
   instructions to apply the status in determining the predicted power-resource quantity for the each of the identified subsystems.

23. The electronic device recited in claim 16 wherein the processor further has:
   instructions to determine actual usage of the resources of the power supply after the function has been performed; and
   instructions to update the past-use information in accordance with the determined actual usage.

24. The electronic device recited in claim 15 wherein a portion of the resources of the power supply are preallocated for use by at least some of the device subsystems when the directive is received.

25. The electronic device recited in claim 24 wherein the portion comprises resources of the power supply preallocated for use only by an emergency function.

26. The electronic device recited in claim 16 wherein the processor further has:
   instructions to identify unused portions of the allocated portions after the function has been performed; and
   instructions to deallocate the identified unused portions.

27. The electronic device recited in claim 15 further comprising a battery that functions as the power supply.

28. A tangible and nontransient computer readable medium comprising processor executable instructions that, when executed, perform the steps of claim 1.

* * * * *